United States Patent [19]

Geise

[11] Patent Number: 4,819,526
[45] Date of Patent: Apr. 11, 1989

[54] CUTTING TOOL AND SYSTEM

[75] Inventor: Sameul C. Geise, Memphis, Tenn.

[73] Assignee: Specialty Tool Company, Memphis, Tenn.

[21] Appl. No.: 873,612

[22] Filed: Jun. 12, 1986

Related U.S. Application Data

[63] Continuation-in-part of Ser. No. 831,168, Feb. 20, 1986, abandoned.

[51] Int. Cl.⁴ .............................. B23B 3/22; B23B 5/16
[52] U.S. Cl. ........................................ 82/113; 29/157.4; 408/80; 408/211
[58] Field of Search .................. 408/82, 83, 124, 125, 408/130, 702, 80, 211; 82/4 C; 29/157.4, 557, 558; 51/170 T; 173/170, DIG. 4; 228/15.1, 170

[56] References Cited

U.S. PATENT DOCUMENTS

| | | | |
|---|---|---|---|
| 2,226,226 | 12/1940 | Hedin | 408/201 |
| 2,925,253 | 2/1960 | Long | 173/170 X |
| 3,020,787 | 2/1962 | Cusick | 408/201 |
| 3,045,648 | 7/1962 | Belau et al. | 173/170 X |
| 3,261,235 | 7/1966 | Henkel | 408/130 X |
| 3,326,304 | 6/1967 | Johnson | 173/170 X |
| 3,999,452 | 12/1976 | Larsen | 408/713 X |
| 4,452,110 | 6/1984 | Emmerson | 408/82 X |
| 4,601,222 | 7/1986 | Gill | 82/4 C |

FOREIGN PATENT DOCUMENTS 0164097 12/1985 European Pat. Off. ............. 82/4 C Primary Examiner—Z. R. Bilinsky
Attorney, Agent, or Firm—Walker & McKenzie

[57] ABSTRACT

A device for cutting a precise angle into the end of a tube. The device includes a tool having a pilot member insertable into the end of the tube, a plurality of spaced apart cutting members for engaging the end of the tube, and a body rigidly joining the pilot member and cutting members to one another. A drive mechanism is attached to the body for selectively rotating the tool.

23 Claims, 6 Drawing Sheets

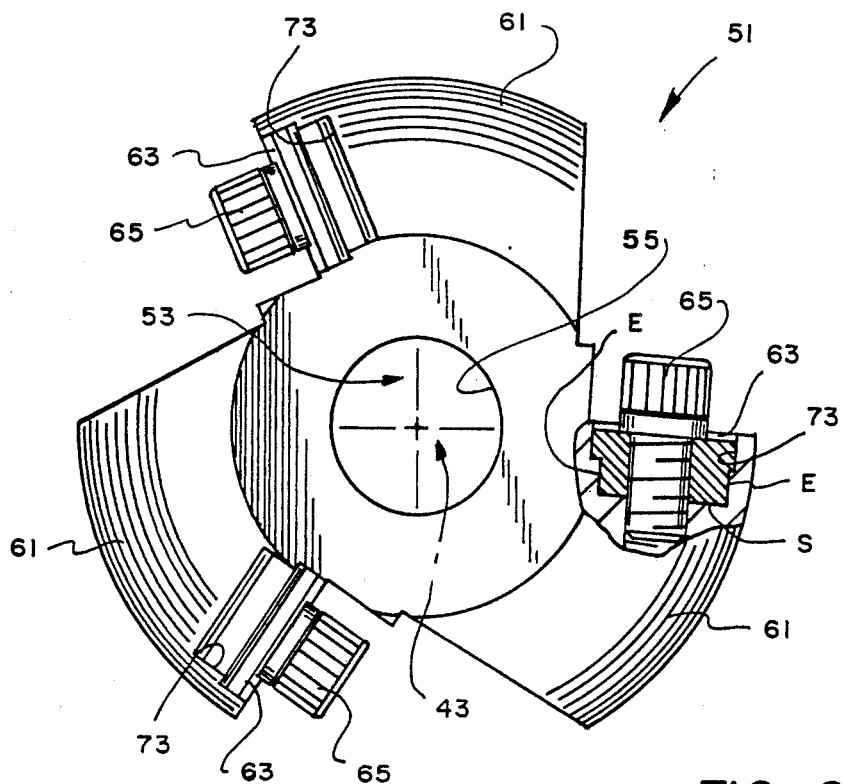
FIG. 4
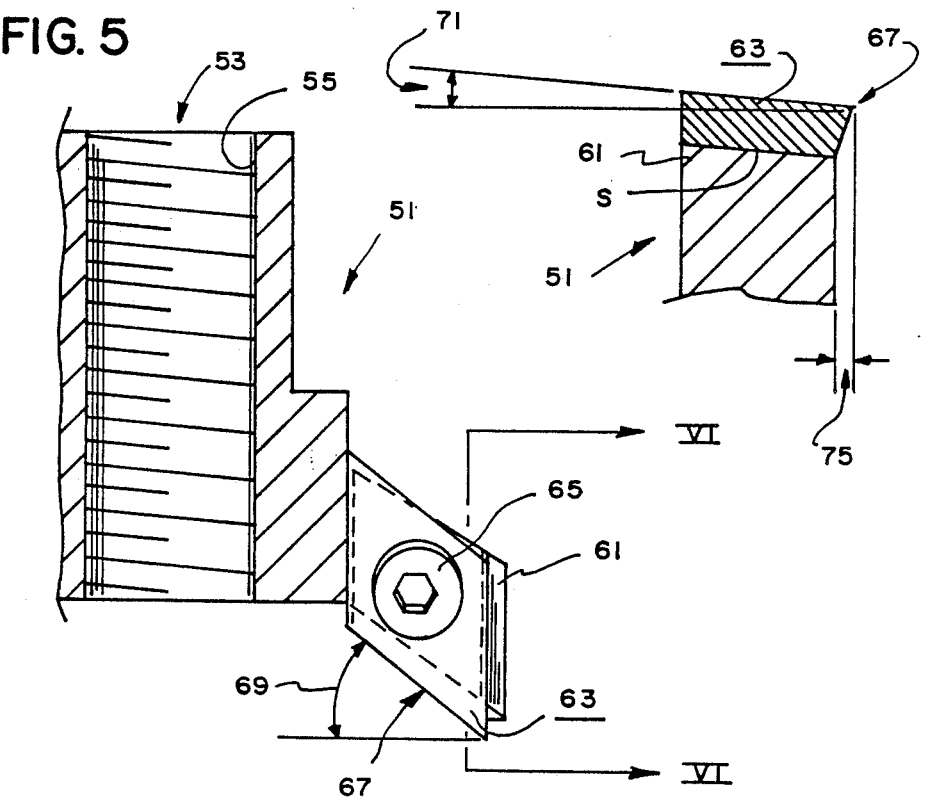
FIG. 5
FIG. 6

CUTTING TOOL AND SYSTEM

CROSS-REFERENCE TO RELATED APPLICATION

This is a continuation-in-part of my copending application, Ser. No. 06/831,168, filed Feb. 20, 1986, entitled "CUTTING TOOL AND SYSTEM" now abandoned.

BACKGROUND OF THE INVENTION

1. Field of the Invention

The present invention relates, in general, to tools for and systems of cutting precise angles into the distal end of a tube.

2. Description of the Prior Art

Portions of the boiler tubes in fossil fuel steam plants and the like often corrode, etc., and must be repaired or replaced. The typical procedure involves removing the corroded section of tube and welding a new section of tube in its place. Proper welding procedures require than an angle of 37½° or the like be cut into the ends of the tubes to be welded together to allow a strong welded joint therebetween. Current procedures consist of fixedly attaching a lathe-like machine to one end of the tube remaining in the boiler and then activating the machine to cut the precise angle into the end of the tube. The current procedure consists of using an air-operated tool that turns at approximately 300 revolutions per minute. Also, this tool weighs about 25 pounds. Thus, such a procedure is highly disadvantageous in that, for example, it takes roughly an hour to prepare two or three tubes for welding under normal, realistic conditions. Under ideal conditions, the current procedure may be able to prepare 10 or so tubes for welding in an hour. Also, because of the limited space available within a typical boiler, it is often difficult to properly position such machines on the ends of the tubes.

SUMMARY OF THE INVENTION

The present invention is directed toward providing an improved cutting tool and an improved system for cutting a precise angle in the ends of boiler tubes and the like. The concept of the present invention is to provide a hand-held system which is capable of cutting precise angles in the ends of 20 or so boiler tubes or the like within an hour under normal, realistic conditions and 125 or so boiler tubes or the like within an hour under ideal conditions.

The cutting tool of the present invention comprises, in general, pilot means insertable into the end of a boiler tube or the like for rotation within the end of the tube and for maintaining the axis of the cutting tool aligned with the axis of the end of the tube as the cutting tool is rotated; a plurality of spaced apart cutting means engaging the end of the tube for cutting a precise angle into the end of the tube as the cutting tool is rotated; and body means attached to the cutting means, the pilot means and a drive mechanism for rigidly joining the cutting means to the pilot means.

BRIEF DESCRIPTION OF THE DRAWINGS

FIG. 4 is a front elevation of FIG. 2 with a portion thereof broken away for clarity.

FIG. 5 is a sectional view substantially as taken on line V—V of FIG. 3.

FIG. 6 is a sectional view substantially as taken on line VI—VI of FIG. 5.

DESCRIPTION OF THE PREFERRED EMBODIMENT

Figure 1:
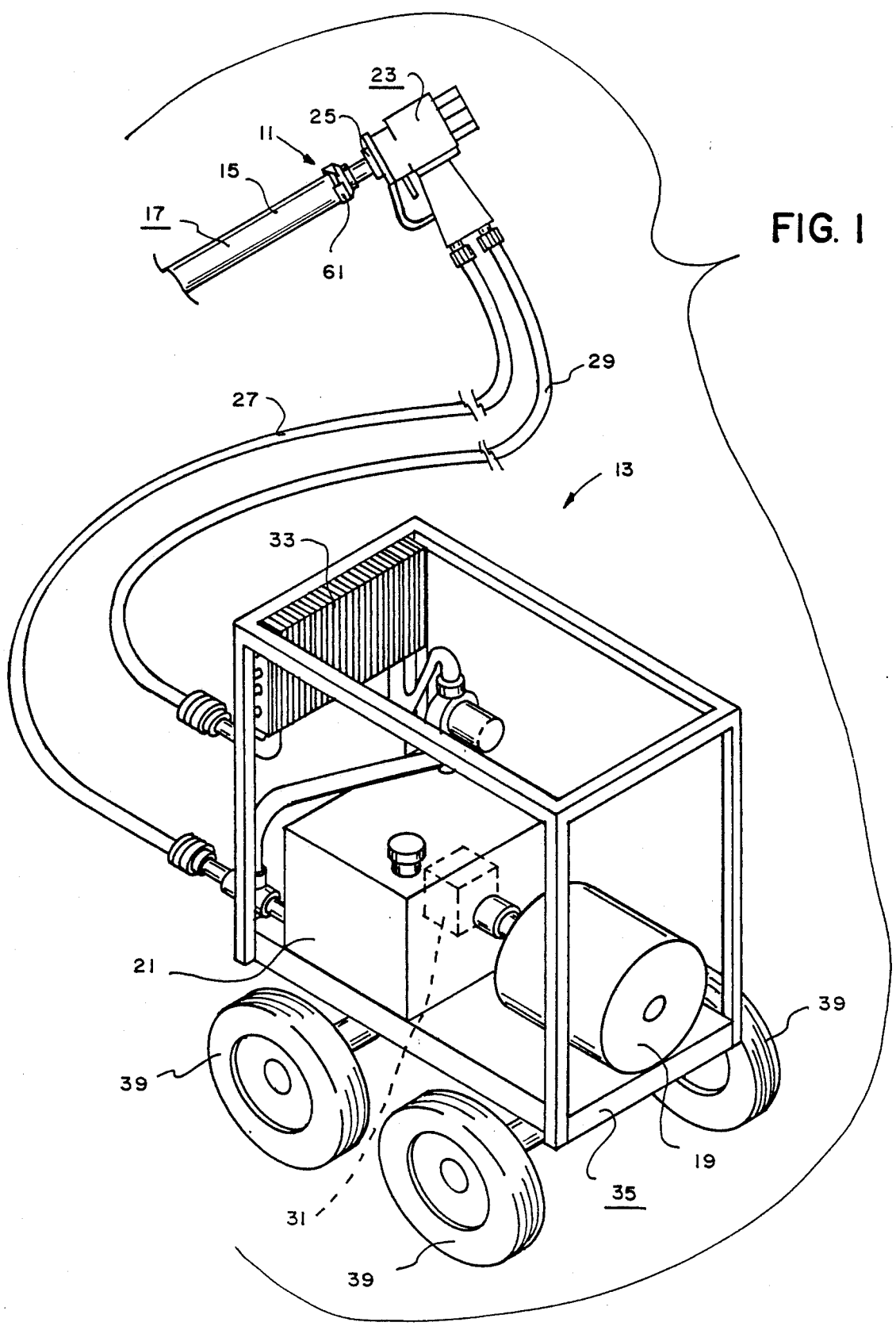
FIG. 1 is a perspective view of the cutting tool and system of the present invention in operation.

The cutting tool 11 of the present invention is used with a drive mechanism 13 for rotating the cutting tool 11 to cut a precise angle into the end 15 of a tube 17 such as a boiler tube of a fossil fuel steam plant of the like (see FIG. 1).

The drive mechanism 13 preferably includes a drive motor 19 which may consist of a typical electric motor or the like, a reservoir 21 of hydraulic fluid, a hydraulic motor 23 which may be of typical construction well known to those skilled in the art having a rotatable output shaft 25 and capable of rotating 12,000 revolutions per minute, a hydraulic fluid feed line 27 extending from the reservoir 21 to the hydraulic motor 23, a hydraulic fluid return line 29 extending from the hydraulic motor 23 to the reservoir 21, and a hydraulic pump 31 coupled to the reservoir 21 and to the drive motor 19 for being driven by the drive motor 19 to pump hydraulic fluid from the reservoir 21 through the hydraulic fluid feed line 27 to the hydraulic motor 23 causing the output shaft 25 of the hydraulic motor 23 to rotate. The hydraulic fluid pumped to the hydraulic motor 23 will then return to the reservoir 21 through the hydraulic fluid return line 29. The hydraulic fluid feed and return line 27, 29 preferably consists of elongated, flexible rubber hoses or the like. The drive mechanism 13 preferably includes a radiator means 33 for cooling the hydraulic fluid. The radiator means 33 may be of any typical construction well known to those skilled in the art and may be located between the reservoir 21 and the hydraulic fluid return line 29 for receiving hydraulic fluid from the hydraulic fluid return line 29 prior to the hydraulic fluid passing back into the reservoir 21. The drive mechanism 13 preferably includes a cart member 35 on which the drive motor 19, reservoir 21, hydraulic pump 31 and radiator means 33 are mounted. The cart member 35 preferably includes a rigid frame 37 constructed of metal or the like to which the drive motor 19, reservoir 21, hydraulic pump 31 and radiator means 33 are mounted, and wheels 39 rotatably mounted to the frame 37 for allowing the drive motor 19, reservoir 21, hydraulic pump 31 and radiator means 33 to be easily moved.

Figure 7:
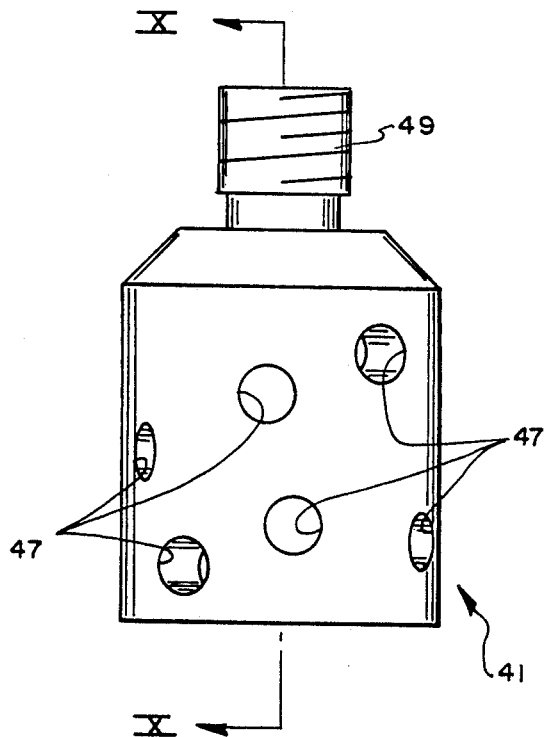
FIG. 7 is a top view of the pilot means of the cutting tool of the present invention.
Figure 8:
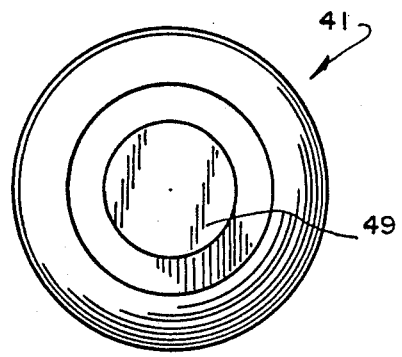
FIG. 8 is a rear elevation of FIG. 7.
Figure 9:
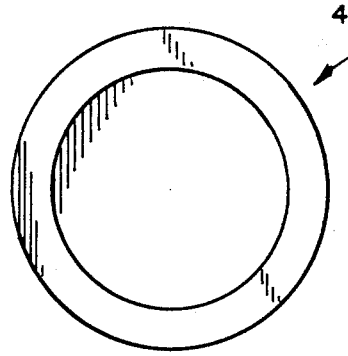
FIG. 9 is a front elevation of FIG. 7.
Figure 10:
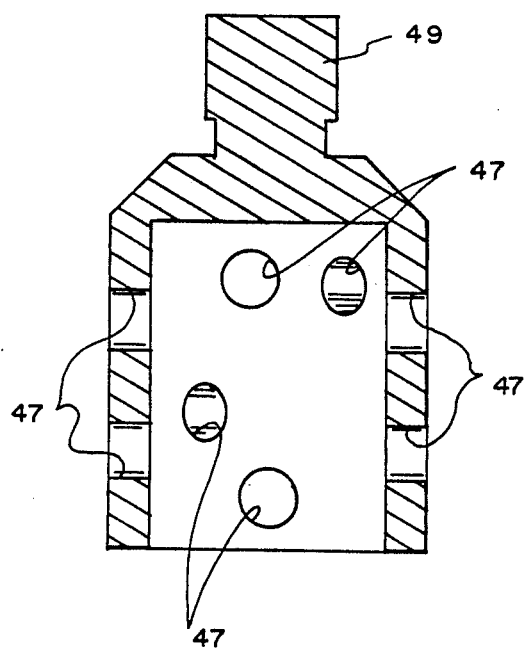
FIG. 10 is a sectional view as taken on line X—X of FIG. 7.
Figure 11:
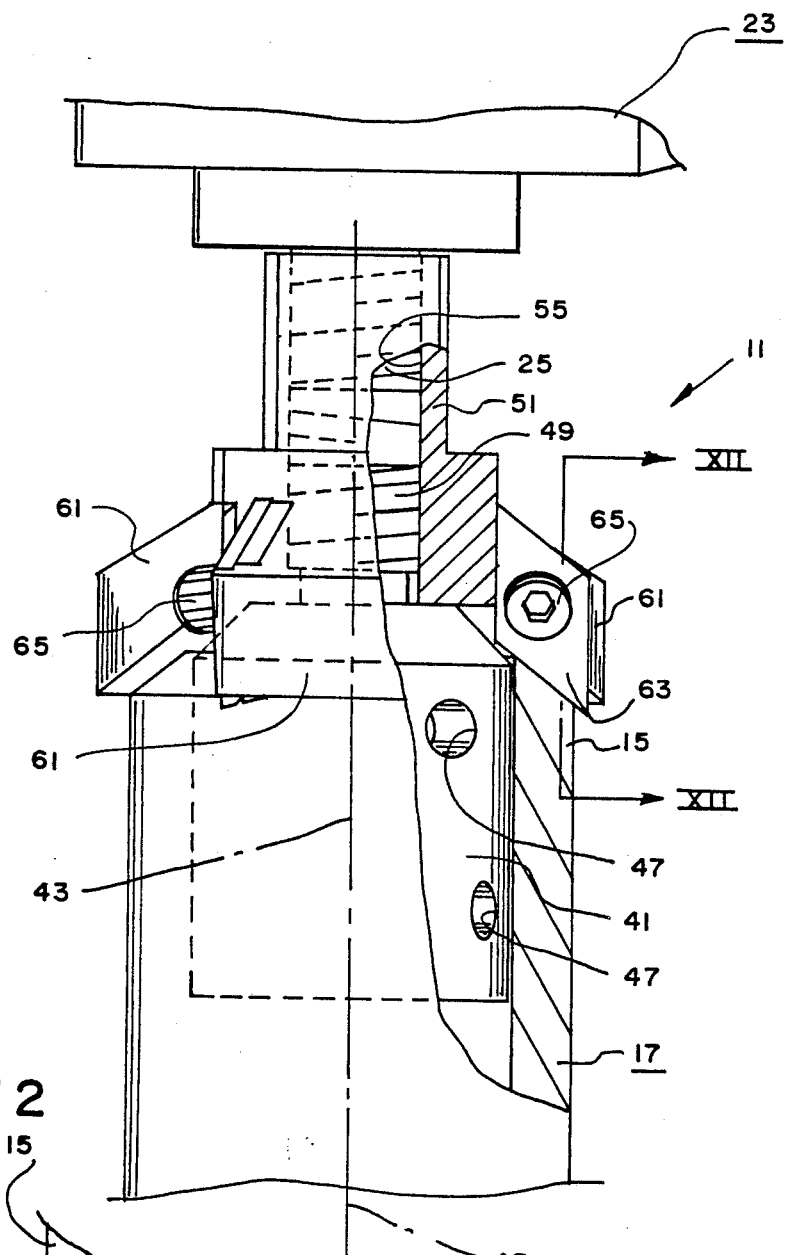
FIG. 11 is an assembly view of the cutting tool of the present invention shown attached to the output shaft of a hydraulic motor and shown coupled to the end of a tube.
Figure 12:
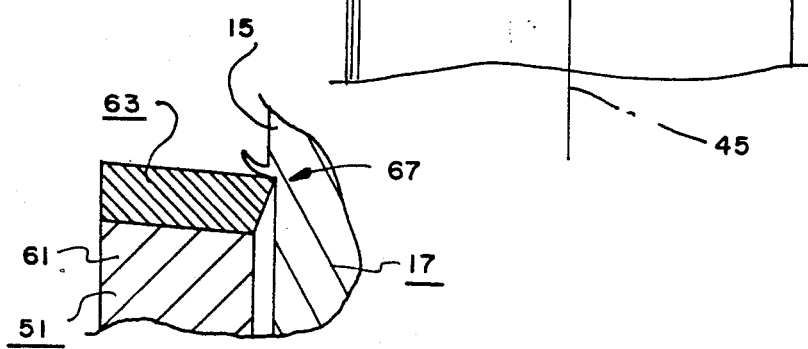
FIG. 12 is a sectional view substantially as taken on line XII—XII of FIG. 11.

The cutting tool 11 includes a pilot means 41 (see FIG. 7) insertable into the end 15 of the tube 17 for rotation within the end 15 of the tube 17 and for maintaining the axis 43 of the cutting tool 11 aligned with the axis 45 of the end 15 of the tube 17 as the cutting tool 11 is rotated (see FIG. 11). The pilot means 41 may be machined out of metal or the like with an outer diameter that is slightly less than the inner diameter of the end 15 of the tube 17 to allow the pilot means 41 to freely rotate within the end 15 of the tube 17. The pilot means 41 may be of a substantially hollow construction with a plurality of apertures 47 through the outer wall thereof to reduce the weight of the pilot means 41 and, therefore, the cutting tool 11. An externally threaded boss member 49 is preferably provided at or coupled to one end of the pilot means 41 (see FIG. 7) for reasons which will hereinafter become apparent. The pilot means 41 and boss member 49 may be machined out of metal as an integral, unitary structure.

Figure 2:
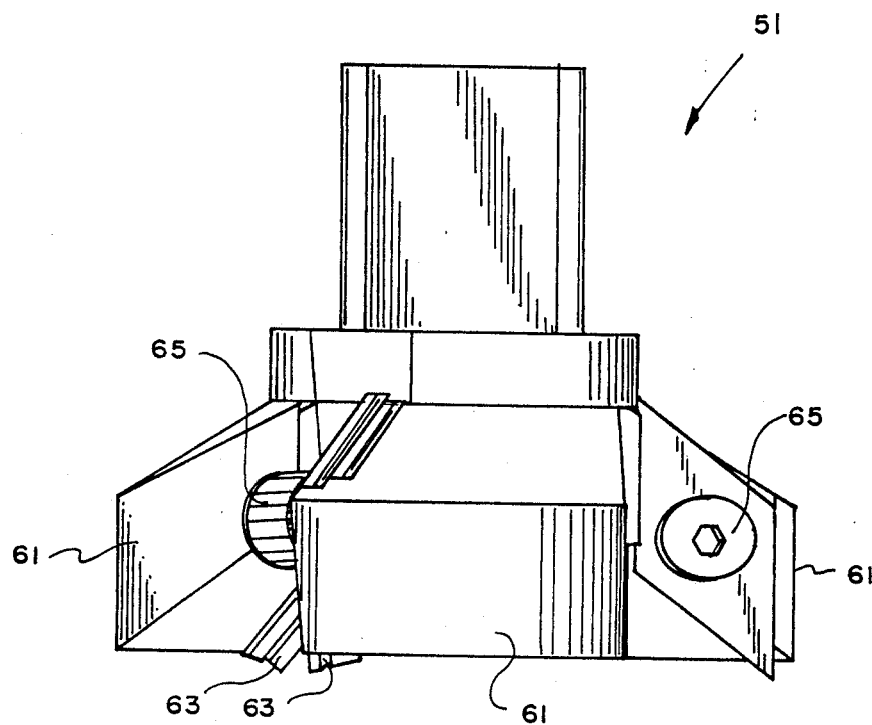
FIG. 2 is a top view of the body means and cutting means of the cutting tool of the present invention with the pilot means removed therefrom.
Figure 3:
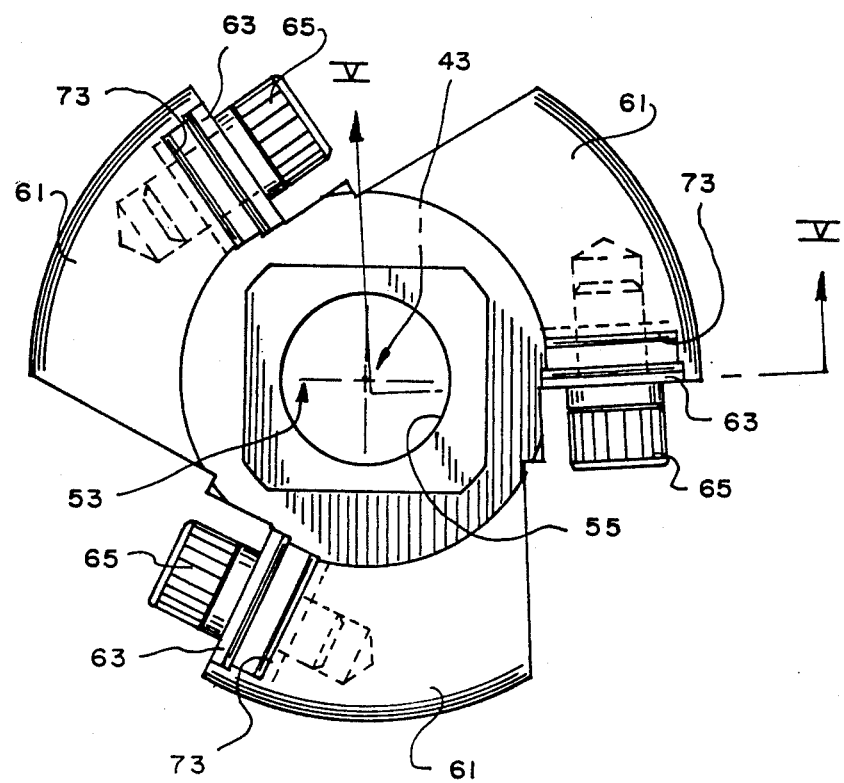
FIG. 3 is a rear elevation of FIG. 2.

The cutting tool 11 includes a body means 51 (see FIG. 2) for being attached to the pilot means 41 and the drive mechanism 13. More specifically, a first end of the body means 51 preferably includes a coupling means 53 for being fixedly attached to the output shaft 25 of the hydraulic motor 23 of the drive mechanism 13 whereby the body means 51 and pilot means 41 will rotate when the output shaft 25 of the hydraulic motor 23 rotates. The specific construction of the coupling means 53 of the body means 51 and the output shaft 25 of the hydraulic motor 23 may vary as will be apparent to those skilled in the art. Thus, for example, the coupling member 53 may be defined by an internally threaded aperture 55 in the body means 51 and the distal end of the output shaft 25 may be provided with external threads for threadingly engaging the aperture 55 to thereby connect the body means 51 to the output shaft 25 of the hydraulic motor 23 (see FIG. 11). It should be noted, of course, that the direction of rotation of the threads of the aperture 55 and output shaft 25 should be opposite the direction of rotation of the output shaft 25 to more securely attach the body means 51 to the output shaft 25. The second end of the body means 51 also preferably includes an internally threaded aperture for threadingly receiving the boss member 49 of the pilot means 41 to thereby removably secure the pilot means 41 to the body means 51. The direction of rotation of the threads of the aperture and boss member 49 are also, of course, opposite the direction of rotation of the output shaft 25 to more securely attach the pilot means 41 to the body means 51. The aperture 55 may extend completely through the body means 51 for threadingly receiving the output shaft 25 in one end and the boss member 49 in the other end (see FIG. 11). The midportion of the body means 51 preferably includes a plurality of spaced apart arm members 61 extending radially outward from the axis 43 of the cutting tool 11 (see, in general, FIG. 3) for reasons which will hereinafter become apparent. The body means 51 may be machined out of metal in any manner apparent to those skilled in the art.

The cutting tool 11 includes a plurality of spaced apart cutting means 63 attached to the body means 51 for rotation therewith and engaging the end 15 of the tube 17 for cutting a precise angle into the end 15 of the tube 17 as the cutting tool 11 is rotated. The cutting tool 11 preferably includes a cutting means 63 rigidly attached to each of the arm members 61 of the body means 51 with the cutting edge of each cutting means 63 located at a precise angle for cutting the precise angle into the distal end 15 of the tube 17. Each cutting means 63 may be rigidly attached to a respective arm member 63 by way of screw means 65 whereby the cutting means 63 can be removed and replaced. Each cutting means 63 had a cutting edge 67 with the end cutting edge angle 69 (see FIG. 5) equal to the precise angle to be cut into the distal end 15 of the tube 17 when the cutting means 63 is rigidly attached to the body means 51. The end cutting edge angle 69 preferably equals 37½° for reasons which will hereinafter become apparent. Each cutting means 63 preferably has a negative back rake angle 71 (see FIG. 6) as measured with the cutting means 63 attached to the body means 51. A groove 73 may be provided in each arm member 61 for receiving a cutting means 63 (see FIG. 4). Each cutting means 63 preferably consists of a carbide cutting tool well known to those skilled in the art. Thus, at least the cutting edge 67 of each cutting means 63 is preferably formed out of carbide. A critical feature of the present invention is the structure that substantially fully supports the cutting means 63. More specifically, the grooves 73 of the body means 51 are adapted to support a cutting means 63 substantially 100 percent on the force transmitting surface S and edges E thereof (see, for example, FIG. 4). Thus, the body means 51 preferably fully supports the cutting means 63 on each edge E and the surface S thereof. As will be noted from FIG. 6, the body means 51 provides full support along the surface S of the cutting means 63 from the rear corner of the surface S to the front corner of the surface S. The front end of the cutting means 63 angles outwardly from the front corner of the surface S thereof to the cutting edge 67 as clearly shown in FIG. 6 to define the clearance angle of the cutting means 63 as will now be apparent to those skilled in the art. It should be understood that the term "force transmitting surface" as used in this specification and claims is a relative term referring to the surface of the cutting means 63 that is opposite the cutting edge 67 thereof in the direction force is applied to the cutting tool 63 when in use. Thus, the surface S of the cutting means 63 is the surface where force is transferred or transmitted between the cutting means 63 and body means 51 when the cutting tool 11 is in use. The depth of the clearance angle as indicated by the arrow 75 in FIG. 6 is preferably small to thereby effectively limit the maximum "cut" of the cutting means 63 as will now be apparent to those skilled in the art. The cutting tool 11 is preferably designed to remove (i.e., have a maximum "cut" of) no more than 0.002 inch (0.0508 millimeters) from the end 15 of a tube 17 per revolution. However, since the output shaft 25 of the hydraulic motor 23 preferably rotates at a speed of 12,000 revolutions per minute, the maximum depth of cut of the cutting means 63 per minute is substantial. The small depth 75 also results in a small clearance angle and results in at least 90% of the entire overall length of the cutting means 63 being supported by the body means 63 via the surface S thereof.

The cutting tool 11 preferably includes three cutting means 63 and three arm members 61 equally spaced from one another. The cutting tool 11 should be precisely balanced. Thus, the pilot means 41, body means 51 and cutting means 63 must be precisely machined in order to create a precisely balanced unit. Preferably the pilot means 41 and body means 51 are machined on computer-controlled machines in order to insure precise work. The cutting tool preferably rotates at a speed of at least 3,000 revolutions per minute. More specifically, the cutting tool 11 preferably rotates at a speed of 12,000 revolutions per minute. Further, the cutting tool 11 preferably rotates at a force of at least 45 inch pounds of torque.

As thus constructed, the present invention provides a highly mobile system that allows the cutting tool to be used to cut the end 15 of a tube 17 at a precise angle and that is freely movable by hand, etc. More specifically, the present invention is highly advantageous for use in the repair of boiler tubes and the like. Thus, if a portion of a boiler tube is corroded or the like, that portion is removed in any typical manner (e.g., by being cut out) and the present invention is used to prepare the ends of the tube 17 remaining in the boiler for being properly welded to a replacement tube portion. That is, the cutting tool 11 is merely positioned against one end 15 of the remaining portion of boiler tube 17 (i.e., a first tube) with the pilot means 41 extending into the end 15 of the tube 17. The unit does not, therefore, have to be securely clamped or attached to the tubes as in the case of the prior art lathe-type units, but needs only to be held against one end of the tube to be machined by hand pressure. The motor 23 is then activated to cause the cutting tool 11 to rotate whereby an angle of 37½° is cut into the end 15 of the tube 17. The end of the replacement portion of the boiler tube (i.e., a second tube) is likewise cut or formed to an angle of 37½°. The two prepared ends are then butted together and welded to form a strong, safe joint therebetween. It will be appreciated by those skilled in the art that the combined 37½° angles, when butted together and welded, will give a strong, safe joint.

Figure 13:
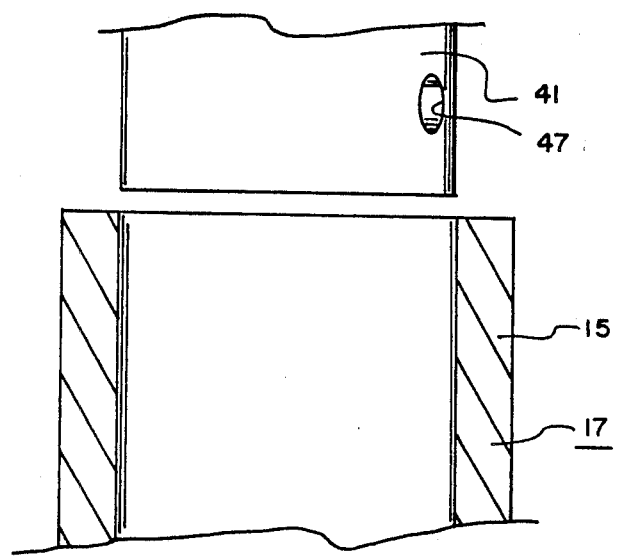
FIG. 13 is a sectional view of one end of a tube associated with an appropriately sized pilot means of the cutting tool of the present invention.
Figure 14:
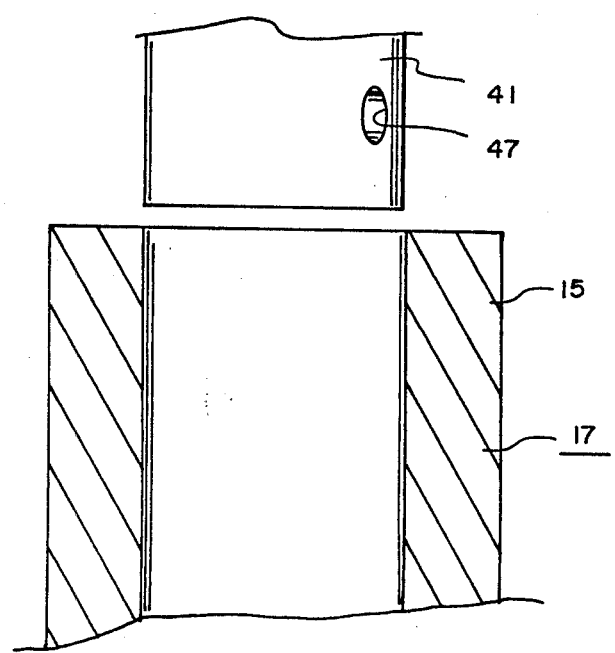
FIG. 14 is a sectional view of one end of a tube having a different sized inside diameter from the tube of FIG. 13, associated with an appropriately sized pilot means.

The cutting tool 11 may be constructed in various specific sizes for various sized tubes 17. Additionally, a plurality of pilot means 41 having different outside diameters may be provided for a single body means 51. For example, a specifically sized body means 51 may be constructed for use with boiler tubes having a 2 inch (50.8 millimeters) outside diameter. However, a boiler having 2 inch boiler tubes may include tubes with varying inside diameters. Thus, a worker using the tool 11 will normally carry a plurality of different sized pilot means 41 (i.e., pilot means 41 having different outside diameters) when entering a boiler or the like. Then, the worker can merely screw out one size pilot means 41 from the body means 51 and screw in another size pilot means 41 to properly fit any specific tube 17. FIG. 13 shows a tube 17 having, for example, a 3 inch (76.2 millimeters) outside diameter and a 2¼ inch (57.15 millimeters) inside diameter and a pilot means 41 sized to fit the 2¼ inch inside diameter while FIG. 14 shows a tube 17 having, for example, a 3 inch outside diameter and a 1¾ inch (44.45 millimeters) inside diameter and a pilot means 41 sized to fit the 1¾ inch inside diameter.

The cutting tool 11 thus allows precise angles to be quickly cut into the end 15 of the tubes 17 regardless of the location of the tubes and even if the tubes 17 are constructed out of very hard material such as stainless steel or the like. While the carbide cutting edge 67 of the cutting means 63 is extremely brittle and easily broken, since the force transmitting surface S of the cutting means 63 is fully supported by the body means 51 and the maximum cut per revolution is no more than 0.002 inch, this will prevent the cutting edge 67 from being inadvertently broken using proper procedures. Further, since the hydraulic motor 23 will inherently absorb impact forces and shock when the cutting means 63 engages a tube 17 as will now be apparent to those skilled in the art, the cutting tool 11 of the present invention will inherently reduce the possibilities of the cutting edge 67 being broken or damaged.

Although the present invention has been described and illustrated with respect to a preferred embodiment thereof and a preferred use therefore, it is not to be so limited since changes and modifications may be made therein which are within the full intended scope of the invention.

I claim:

1. A hand-held system for use by a workperson in cutting a precise angle into the end of a fixed, non-movable boiler tube, said system comprising:
   (a) a cutting tool; and
   (b) a freely movable hydraulic motor for being hand-held by the workperson and for rotating said cutting tool at a speed of at least 3,000 revolutions per minute; said cutting tool including:
      (1) pilot means insertable into the end of the tube for rotation within the end of the tube and for maintaining the axis of said cutting tool aligned with the axis of the end of the tube as said cutting tool is rotated;
      (2) a plurality of spaced apart cutting means engaging the end of the tube for cutting a precise angle into the end of the tube as said cutting tool is rotated and for removing no more than 0.002 of an inch from the end of the tube per revolution, each of said cutting means having a small clearance angle to limit the maximum cut thereof to 0.002 of an inch; and
      (3) body means attached to said cutting means, said pilot means and said hydraulic motor for rigidly joining said cutting means to said pilot means and said hydraulic motor.

2. The system of claim 1 in which said body means has a first end attached to said drive mechanism, has a second end attached to said pilot means, and has a midportion; said midportion of said body means having a plurality of spaced apart arm members extending radially outward from the axis of said cutting tool; each of said cutting means being rigidly attached to a respective one of said arm members.

3. The system of claim 2 in which each of said cutting means has an end cutting edge angle equal to the precise angle to be cut into the end of the tube.

4. The system of claim 3 in which each of said cutting means has a negative back rake angle.

5. The system of claim 4 in which is included screw means attached to each of said arm members of said body means for rigidly but removably securing each of said cutting means to said body means.

6. The system of claim 5 in which said pilot means is screwably attached to said body means.

7. The system of claim 6 in which is included three of said cutting means and three of said arm members equally spaced from one another.

8. The system of claim 1 in which each of said cutting means includes a force transmitting surface and in which said force transmitting surface of each of said cutting means is substantially fully supported by said body means.

9. The system of claim 1 in which is included a hydraulic drive mechanism for causing said cutting means to rotate and for absorbing at least a portion of any impact forces applied to said cutting means by the end of the tube.

10. A hand-held system for use by a workperson in cutting a precise angle into the end of a fixed, non-movable first boiler tube to allow a second boiler tube to be welded to the end of the first boiler tube, said system comprising:

(a) a hydraulic drive mechanism including a drive motor, a reservoir of hydraulic fluid, a freely movable hydraulic motor for being hand-held by the workperson and having a rotatable output shaft, a hydraulic fluid feed line extending from said reservoir to said hydraulic motor, a hydraulic fluid return line extending from said hydraulic motor to said reservoir, and a hydraulic pump coupled to said reservoir and to said drive motor for being driven by said drive motor to pump hydraulic fluid from said reservoir through said hydraulic fluid feed line to said hydraulic motor causing said output shaft of said hydraulic motor to rotate; and (b) a cutting tool attached to said output shaft of said hydraulic motor for being rotated thereby at a speed of approximately 12,000 revolutions per minute, said cutting tool including:

(1) pilot means insertable into the end of the first boiler tube for rotation therewithin and for maintaining the axis of said cutting tool aligned with the axis of the end of the first boiler tube as said cutting tool is rotated by said hydraulic motor;

(2) a plurality of spaced apart cutting means engaging the end of the first boiler tube for cutting a precise angle into the end of the first boiler tube as said cutting tool is rotated and for removing no more than 0.002 of an inch from the end of the first boiler tube per revolution, each of said cutting means having a small clearance angle to limit the maximum cut thereof to 0.002 of an inch; and (3) body means attached to said cutting means, said pilot means and said output shaft of said hydraulic motor for rigidly joining said cutting means to said pilot means.

11. The system of claim 10 in which said hydraulic drive mechanism includes radiator means for cooling said hydraulic fluid.

12. The system of claim 11 in which said hydraulic drive mechanism includes a cart member on which said drive motor, said reservoir and said hydraulic pump are mounted.

13. The system of claim 12 in which said cart member has wheels for allowing said drive motor, said reservoir and said hydraulic pump to be easily moved.

14. The system of claim 13 in which said body means has a first end attached to said output shaft of said hydraulic motor, has a second end attached to said pilot means; and has a midportion; said midportion of said body means having a plurality of spaced apart arm members extending radially outward from the axis of said cutting tool; each of said cutting means being rigidly attached to a respective one of said arm member.

15. The system of claim 14 in which each of said cutting means has an end cutting edge angle equal to the precise angle to be cut into the end of the tube.

16. The system of claim 15 in which each of said cutting means has a negative back rake angle.

17. The system of claim 16 in which is included screw means attached to each of said arm members of said body means for rigidly but removably securing each of said cutting means to said body means.

18. The system of claim 17 in which said pilot means is screwably attached to said body means.

19. The system of claim 18 in which is included three of said cutting means and three of said arm members equally spaced from one another.

20. The system of claim 10 in which said cutting tool is precisely balanced.

21. The system of claim 10 in which said cutting means are held against the end of the first boiler tube with hand pressure only.

22. A cutting tool used with a freely movable, hand-held hydraulic motor for rotating said cutting tool at a speed of at least 3,000 revolutions per minute to cut a precise angle into the end of a fixed, nonmovable boiler tube, said cutting tool comprising:

(a) a plurality of pilot means, each of said pilot means having a different size outside diameter, one of said pilot means being insertable into the end of the tube for rotation within the end of the tube and for maintaining the axis of said cutting tool aligned with the axis of the end of the tube as said cutting tool is rotated;

(b) a plurality of spaced apart cutting means engaging the end of the tube for cutting a precise angle into the end of the tube as said cutting tool is rotated and for removing no more than 0.002 of an inch from the end of the tube per revolution, each of said cutting means having a small clearance angle to limit the maximum cut thereof to 0.002 of an inch; and (c) body means attached to said cutting means, said one of said pilot means and said drive mechanism for rigidly joining said cutting means to said one of said pilot means.

23. The cutting tool of claim 22 in which each of said pilot means includes a threaded portion and in which said body means has a threaded portion for coacting with said threaded portion of any of said pilot means for attaching any one of said pilot means to said body means.

* * * * *